(12) United States Patent
Binev (10) Patent No.: US 7,559,401 B2
(45) Date of Patent: Jul. 14, 2009

(54) HYDROSTATIC DRIVE SYSTEM

(75) Inventor: Binio Binev, Haibach (DE)

(73) Assignee: Linde Material Handling GmbH, Aschaffenburg (DE)

( * ) Notice: Subject to any disclaimer, the term of this patent is extended or adjusted under 35 U.S.C. 154(b) by 457 days.

(21) Appl. No.: 11/234,071

(22) Filed: Sep. 23, 2005

(65) Prior Publication Data

US 2006/0090949 A1 May 4, 2006

(30) Foreign Application Priority Data

Sep. 24, 2004 (DE) .................. 10 2004 046 313

(51) Int. Cl.
*B60K 17/00* (2006.01)
*F16H 39/00* (2006.01)
*F16H 61/00* (2006.01)

(52) U.S. Cl. .................. 180/307; 180/305; 180/306; 180/367

(58) Field of Classification Search .......... 180/305, 180/306, 307, 367
See application file for complete search history.

(56) References Cited

U.S. PATENT DOCUMENTS

| 6,202,783 B1 * | 3/2001 | Taylor et al. ............ 180/305 |
| 6,896,092 B2 * | 5/2005 | Stall ............................ 180/403 |
| 2002/0096840 A1 * | 7/2002 | Sulzyc et al. ............ 280/5.514 |

FOREIGN PATENT DOCUMENTS

| DE | 102 03 160 A1 | | 8/2003 |
| FR | 2 636 893 A1 | | 3/1990 |
| GB | 2169688 A | * | 7/1986 |
| GB | 2200961 A | * | 8/1988 |
| GB | 2205632 A | * | 12/1988 |
| GB | 2 222 664 A | | 3/1990 |
| GB | 2222664 A | * | 3/1990 |
| GB | 2240836 A | * | 8/1991 |

* cited by examiner

*Primary Examiner*—Christopher P Ellis
*Assistant Examiner*—Jacob Meyer
(74) *Attorney, Agent, or Firm*—The Webb Law Firm (57) ABSTRACT

A hydrostatic drive system has a travel drive (4) and working hydraulics (6). The working hydraulics (6) have a variable delivery pump (5) connected to the driving engine (1). The pump (5) is connected to a container (10) on the inlet side and delivers to a delivery line (11), to which at least one consumer of the working hydraulics (6) is connected. The pressure medium delivered by the pump (5) is feedable to a pressure valve (9). The pressure valve (9) is arranged in the delivery line (11) from the pump (5) to a control valve device (13; 15; 17; 18). A container branch line (29), which is connected to a container (10) and in which a circulating device (31) is arranged, is connected to the delivery line (11) downstream of the pressure valve (9).

23 Claims, 3 Drawing Sheets

HYDROSTATIC DRIVE SYSTEM

CROSS-REFERENCE TO RELATED APPLICATION

This application claims priority to German Application No. 10 2004 046 313.1 filed Sep. 24, 2004, which is herein incorporated by reference in its entirety.

BACKGROUND OF THE INVENTION

1. Field of the Invention

The invention relates to a hydrostatic drive system for a mobile machine, such as a fork lift truck, with a travel drive and working hydraulics. The working hydraulics have a variable delivery pump which is operatively connected to the driving engine, is connected to a container on the inlet side, and delivers to a delivery line, to which at least one consumer of the working hydraulics is connected. The consumer is controllable by means of a control valve device having a closed neutral position. The pump is adjustable in the direction of a higher delivery to generate a braking action in a braking or overrun condition of the travel drive and the pressure medium delivered by the pump is feedable to a pressure valve.

2. Technical Considerations

Mobile machines, for example fork lift trucks, with a driving engine designed as an internal combustion engine, in particular a diesel engine, generally have a hydrostatic travel drive with at least one motor connected in a closed circuit to a pump, and working hydraulics operated in an open circuit. The pump of the working hydraulics may be designed as a variable delivery pump. The control valve devices for controlling the consumers of the working hydraulics, for example a lifting drive, an inclining drive, and, optionally, a side loader, as well as further additional consumers of a machine designed as a fork lift truck, in this case have a closed neutral position in which the delivery line of the pump is closed off.

The hydrostatic travel drive may be used as a service brake. In a braking condition, the driving engine is adjusted to the lower idling rotational speed and the transmission ratio of the travel drive is changed, for example by adjusting the pump in the direction of minimum delivery. As a result of the mass inertia of the vehicle, the power flow in the closed circuit reverses, the motor operating as a pump and delivering pressure medium to the pump operating as a motor. In overrun condition, for example when the machine is travelling downhill, the motor is likewise driven and operates as a pump, which delivers pressure medium to the pump operating a motor.

In the pressure-medium line, led from the motor to the pump, of the travel drive, a braking pressure builds up in braking or overrun condition and generates at the pump a torque which accelerates the driving engine. The drag torque which can be taken up by the driving engine can thus be used to brake the machine.

The increase in rotational speed of the driving engine which occurs in braking or overrun conditions may lead to racing of the driving engine at undesirably high rotational speeds if the drag torque, which can be taken up by the driving engine, is not sufficient to brake the vehicle. As a result of which, mechanical damage and increased wear of the driving engine may occur.

In order to avoid such an increase in rotational speed of the driving engine in braking or overrun conditions to an undesirably high rotational speed, it is known to provide an additional braking action by using the pump provided for supplying the working hydraulics to consume braking energy as well. In drive systems with a variable delivery pump for supplying the working hydraulics, the pump is in this case adjusted in the direction of a higher delivery in a braking or overrun condition, and the pressure medium accumulated in the delivery line of the pump is drained to a container via a pressure valve designed as a pressure-limiting valve and arranged in a line connecting the delivery line of the pump to the container.

In such an arrangement of the pressure valve, in which the pressure medium delivered by the pump in a braking or overrun condition is drained to a container via the pressure valve, operating states may, however, occur in which no pressure medium is supplied to the consumers in a braking or overrun condition of the machine. As a result of which, no actuation of the consumers of the working hydraulics is possible and thus no functions of the working hydraulics can be carried out. Particularly in the case of a machine designed as a fork lift truck, however, in a braking or overrun condition, in particular in a reversing operation, i.e., braking and change of the direction of travel, an actuation and, thus, a function of the consumers of the working hydraulics is desired to enable a movement of the load picked up by the fork lift truck.

An object on which the present invention is based is to provide a drive system of the generic type mentioned above but which ensures an actuation of the consumers of the working hydraulics in an overrun or braking condition.

SUMMARY OF THE INVENTION

This object is achieved according to the invention in that the pressure valve is arranged in the delivery line led from the pump to the control valve device. A container branch line, which is connected to a container and in which a circulating device is arranged, is connected to the delivery line downstream of the pressure valve.

According to the invention, the pressure valve which generates the additional braking action in braking or overrun conditions is thus arranged directly in the delivery line, leading to the control valve devices of the working hydraulics, of the pump of the working hydraulics. As a result of which, the pressure medium delivered by the pump of the working hydraulics is available in braking or overrun conditions, via the actuated pressure valve, to the consumers of the working hydraulics when the control valve devices for actuating the consumers are driven. As a result, in braking or overrun conditions, where an additional braking action is achieved by the pressure valve, a supply of pressure medium to the driven consumers and thus an operation of the consumers of the working hydraulics and a function of the working hydraulics is ensured. By means of the circulating device which, according to the invention, is arranged in a branch line which is connected to the delivery line downstream of the pressure valve and is led to a container, it is in this case achieved in a simple manner that the pressure medium delivered in excess by the pump and not required by the driven consumers of the working hydraulics in braking or overrun conditions, where an additional braking action is achieved by the pressure valve, can flow off to the container.

According to a preferred embodiment of the invention, the pressure valve is designed as a proportionally adjustable pressure valve, in particular proportionally adjustable by means of an electrical actuating device. As a result, the biasing pressure generated in the delivery line by the pressure valve and thus the braking power generated by the pressure valve can be adapted in a simple manner to the current operating state of the driving engine, in order to avoid an undesirably high increase in rotational speed in a braking or overrun condition. The pressure valve may be hydraulically driven. If the pressure valve is drivable by means of an electrical actuating device, the pressure valve can be controlled in a simple manner by control electronics of the machine.

Advantageously, the actuating device of the pressure valve is, in this case, designed as a proportional magnet.

Particular advantages are obtained if the pressure valve can be urged in the direction of an increase of the setting pressure by means of the actuating device. The actuating device thus only has to be driven, in braking or overrun conditions of the travel drive, in order to achieve an additional braking action. In the non-driven state, the pressure valve is situated at a minimum setting pressure so that, upon a sole actuation of the working hydraulics or an actuation of the working hydraulics in the driving phase of the travel drive, no additional energy losses are caused at the pressure valve.

With particular advantage, the pressure valve is controllable in dependence on the rotational speed of the driving engine in a braking or overrun condition. As a result, it is achieved in a simple manner that the pressure valve is driven in a braking or overrun condition as soon as the rotational speed of the driving engine reaches and exceeds a predetermined rotational speed limit valve, the pressure valve enabling the biasing pressure and thus the braking power to be adapted in a simple manner to the change in rotational speed of the driving engine.

According to a preferred embodiment of the invention, the circulating device has a blocking position and a throughflow position, the circulating device being able to be urged from the blocking position in the direction of the throughflow position in order to discharge the pressure medium delivered in excess by the pump. As a result, it can be achieved in a simple manner that the circulating device is urged into the blocking position upon an actuation of the working hydraulics when the machine is stationary or in the driving phase of the travel drive and can be urged into the throughflow position in a braking or overrun condition, where an additional braking action is generated by the pressure valve, in order to discharge the pressure medium, delivered in excess by the pump and exceeding the demand of the driven consumers of the working hydraulics, to the container. With such a circulating device, it is likewise possible, with a pump which generates a minimum pressure-medium flow when the working hydraulics are not driven and is thus in the non-displaced neutral position, by urging the circulating device into the throughflow position, to discharge to the container with low losses the minimum pressure-medium flow delivered by the pump.

According to a preferred configuration of the invention, the circulating device is designed as a pressure balance which can be urged by means of the delivery pressure present in the delivery line downstream of the pressure valve in the direction of the throughflow position and can be urged by a spring and by the delivery pressure present in the delivery line in the direction of the blocking position. The urging of the pressure balance in the direction of the blocking position is able to be switched over from the delivery pressure to the load pressure, present in a load pressure-indicating line of the working hydraulics, of the consumer of the working hydraulics in order to discharge the pressure medium delivered in excess by the pump. As a result, it is achieved in a simple manner that the pressure balance is urged into the blocking position by the delivery pressure upon an actuation of the working hydraulics when the vehicle is stationary or in the driving phase of the travel drive, and in a braking or overrun condition, where the pressure valve is driven and generates an additional braking action, through the urging in the direction of the blocking position by the load pressure of the consumers of the working hydraulics, has the function of an inlet pressure balance and thus, upon an actuation of the working hydraulics, enables the discharge of the pressure medium delivered in excess by the pump. In addition, the urging of the pressure balance by the load pressure of the working hydraulics makes it possible in a simple manner, with a pump which generates a minimum pressure-medium flow in the neutral position when the working hydraulics are not driven, for the pressure-medium flow delivered by the pump when the working hydraulics are not driven and thus the load pressure-indicating line is relieved to be led to the container with low losses via the pressure balance which has the function of an inlet pressure balance and is urged in the direction of the blocking position by the load pressure present in the load pressure-indicating line.

According to a preferred development of the invention, the circulating device is controllable by means of a switching valve device. With a switching valve device, it is possible in a simple manner to control the urging of the pressure balance in the direction of the blocking position and to switch over the urging of the pressure balance in the direction of the blocking position from the delivery pressure to the load pressure, conveyed in the load pressure-indicating line, of the consumers of the working hydraulics.

In this case, the switching valve device advantageously has a first switching position, in which a control surface, acting in the direction of the blocking position, of the circulating device is connected to the delivery line of the pump, in particular upstream of the pressure valve, and a second switching position, in which the control surface, acting in the direction of the blocking position, of the circulating device is connected to the load pressure-indicating line of the working hydraulics. With such a switching valve device having two switching positions, it is possible in a simple manner to switch over the urging of the control surface, acting in the direction of the blocking position, of the circulating device designed as a pressure balance from the delivery pressure to the load pressure conveyed in the load pressure-indicating line.

A simple control is obtained if the switching valve device, according to a preferred configuration, can be urged into the second switching position in order to generate a braking action in a braking or overrun condition and/or discharge the pressure medium delivered in excess by the pump.

According to a preferred development of the invention, it is provided that an adjusting apparatus which controls the delivery of the pump can be urged in the direction of an increase of the delivery by means of the switching valve device in order to generate the braking action. With the switching valve device, the pump can be adjusted in a simple manner in the direction of an increase of the delivery in a braking or overrun condition. As a result of which, no additional control device is required to adjust the pump in a braking or overrun condition to an increased delivery in order to generate an additional braking action.

Advantageously, the adjusting apparatus of the pump has an adjusting cylinder device with a spring acting in the direction of maximum delivery and a control pressure space acting in the direction of minimum delivery. The loading of the control pressure space is controllable by means of a demand flow-regulating valve which has a first switching position, which acts in the direction of an increase of the delivery of the pump and in which the control pressure space is connected to a container, and a second switching position which acts in the direction of a reduction of the delivery of the pump and in which the control pressure space is connected to the delivery line of the pump. The demand flow-regulating valve is able to be urged in the direction of the first switching position by a spring and the pressure present in a load pressure-indicating line, and in the direction of the second switching position by the delivery pressure present in the delivery line of the pump. The load pressure-indicating line led to the demand flow-regulating valve is connectable to the delivery line of the pump by means of the switching valve device in order to increase the delivery of the pump. By connecting the load pressure-indicating line, led to the demand flow-regulating valve, to the delivery line of the pump by means of the switching valve device, it is achieved in a simple manner that, in a braking or overrun condition when the switching valve device is driven, the demand flow-regulating valve is urged into the first switching position and, thus, the pump swings in the direction of maximum delivery.

Advantageously, in this case, a selecting device, such as a shuttle valve device, is arranged in the load pressure-indicating line. The selecting device is connected on the outlet side to that section of the load pressure-indicating line which is led to the demand flow-regulating valve, and of which the first inlet is connected to that section of the load pressure-indicating line which is connected to the consumers of the working hydraulics. The second inlet is connected to the outlet of the switching valve device. With such a selecting device, it is achieved in a simple manner that the load pressure, present in the load pressure-indicating line, of the driven consumer is led to the demand flow-regulating valve upon an actuation of the working hydraulics when the machine is stationary or in the driving phase of the travel drive, and the load pressure-indicating line led to the demand flow-regulating valve is connectable to the outlet of the switching valve device and, thus, the delivery line of the pump in a braking or overrun condition when the switching valve device is driven.

According to an advantageous embodiment of the invention, the switching valve device is designed as a switch-over valve which in the first switching position connects the control surface, acting in the direction of the blocking position, of the circulating device to the delivery line of the pump, and in a second switching position connects the control surface, acting in the direction of the blocking position, of the circulating device to the load pressure-indicating line of the working hydraulics, and also connects the delivery line to that section of the load pressure-indicating line which is led to the pump. With such a switch-over valve, it is possible in a simple manner to control the switching-over of the circulating device from the blocking position to the function of the inlet pressure balance and the swinging of the pump in braking or overrun conditions in order to generate an additional braking action.

The switch-over valve may be hydraulically controlled. Particular advantages are obtained if the switch-over valve is controllable by means of an electrical actuating device, in particular by means of a switching magnet. The switch-over valve can thus be driven in a simple manner by an electronic control device in order to achieve a switching-over of the circulating device and a swinging of the pump in a braking or overrun condition and when the pressure valve is driven for the additional braking action.

The switch-over valve can advantageously be urged by means of a spring in the direction of the first switching position and by means of the actuating device in the direction of the second switching position.

According to a further advantageous embodiment of the invention, the switching valve device has a first switching valve which in a first switching position connects the control surface, acting in the direction of the blocking position, of the circulating device to the delivery line of the pump, and in a second switching position connects the control surface, acting in the direction of the blocking position, of the circulating device to the load pressure-indicating line of the working hydraulics. The switching valve device has a second switching valve which in a first switching position closes off the connection of the delivery line to that section of the load pressure-indicating line which is led to the pump, and in a second switching position connects the delivery line to that section of the load pressure-indicating line which is led to the pump. With two such switching valves, the switching-over of the circulating device from the blocking position to the function of the inlet pressure balance and the swinging of the pump can be controlled separately. In the case of a pump of the working hydraulics which delivers a minimum delivery flow in the neutral position, it is thereby possible to achieve in a simple manner the situation where, through the separate control of the circulating device, the minimum delivery flow delivered by the pump when the working hydraulics are not driven can flow off to the container via the circulating device.

The minimum delivery flow delivered by the pump in the neutral position can, in this case, be discharged with little outlay in terms of control via the circulating device if the first valve can be urged into the second switching position in order to discharge the pressure medium delivered in excess by the pump.

The first switching valve and/or the second switching valve may be hydraulically actuated. If the first switching valve and/or the second switching valve are controllable by means of an electrical actuating device, in particular by means of a switching magnet, the switching valves of an electronic control device can be driven in a simple manner.

Advantageously, the first switching valve and/or the second switching valve can be urged by means of a spring in the direction of the first switching position and by means of the actuating device in the direction of the second switching position.

In a development of the invention, it is provided that the pump is used for controlling a hydraulic steering device, a priority valve being arranged in the delivery line upstream of the pressure valve in order to supply the steering device. A preferential supply to the steering device can be ensured in all operating states of the machine by a priority valve arranged in the delivery line in this way.

Advantageously, in this case, a selecting valve, in particular a shuttle valve, is arranged in the load pressure-indicating line downstream of the selecting device, of which valve the outlet is connected to that section of the load pressure-indicating line which is led to the demand flow-regulating valve, the first inlet is connected to that section of the load pressure-indicating line which is connected to the outlet of the selecting device, and the second inlet is connected to a load pressure-indicating line of the steering device.

If the circulating device and/or the pressure valve and/or the circulating device are arranged in a control valve block of the working hydraulics, in which block the control valve devices for controlling the consumers are arranged, a low production outlay for the arrangement of the circulating device, the switch-over device and the pressure valve is obtained.

BRIEF DESCRIPTION OF THE DRAWINGS

Further advantages and details of the invention are explained in more detail with the aid of the exemplary embodiments illustrated in the schematic figures, in which like reference numbers identify like parts throughout.

DESCRIPTION OF THE PREFERRED EMBODIMENTS

Figure 1:
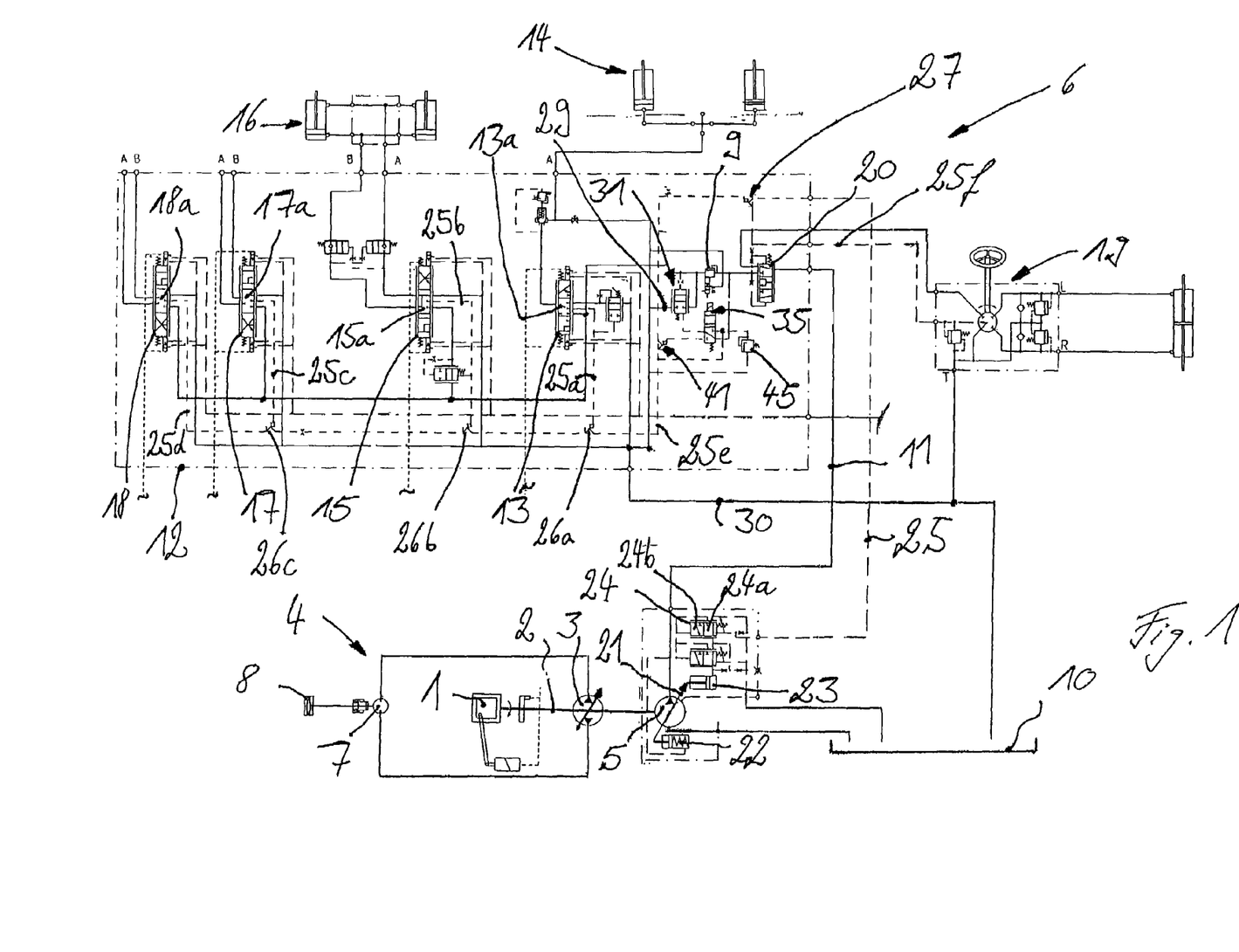
FIG. 1 shows a connection diagram of a first embodiment of a drive system according to the invention.

FIG. 1 illustrates the connection diagram of a first embodiment of a drive system according to the invention. A driving engine 1, designed as an internal combustion engine, for example as a diesel engine, is connected via a drive shaft 2 to a pump 3 of a travel drive 4 and a further pump 5 of working hydraulics 6.

The travel drive 4 is designed as a hydrostatic travel drive with a closed circuit and has at least one hydraulic motor 7, which is provided for driving a drive wheel 8 or an axle of the machine.

The working hydraulics 6 are designed as an open circuit. The pump 5, designed as a variable delivery pump 5, is connected to a container 10 on the inlet side and delivers to a delivery line 11 on the outlet side. The delivery line 11 is led to a control valve block 12 of the working hydraulics 6, which has at least one control valve device for controlling a hydraulic consumer. If the machine is designed as a fork lift truck, the control valve block 12 may have a control valve device 13 for controlling a lifting drive 14 having at least one lifting cylinder, a control valve device 15 for controlling an inclining drive 16 having at least one inclining cylinder, and further control valve devices 17, 18 for optionally present additional consumers, for example a side loader. The pump 5 is furthermore provided for controlling a hydraulic steering device 19. A priority valve 20 for preferentially supplying the steering device 19 is arranged in the delivery line 11 upstream of the connections of the control valve devices 13, 15, 17, 18 of the working hydraulics 6.

The control valve devices 13, 15, 17, 18 of the working hydraulics 6 are in this case designed as control valves with a closed neutral position 13a, 15a, 17a, 18a, in which the delivery line 11 is closed off.

The pump 5 is designed as a demand flow-regulated pump and has an adjusting apparatus 21 which controls the delivery. The adjusting apparatus 21 comprises an adjusting cylinder device with a spring 22 acting in the direction of maximum delivery, and a control pressure space 23 which acts in the direction of minimum delivery and the loading of which is controllable by means of a demand flow-regulating valve 24. The demand flow-regulating valve 24 has a first switching position 24a, which acts in the direction of increasing the delivery and in which the control pressure space 23 is connected to the container 10. In a second switching position 24b, which acts in the direction of reducing the delivery, of the demand flow-regulating valve 24, the control pressure space 23 is connected to the delivery line 11. The demand flow-regulating valve 24 is, in this case, urged by the delivery pressure present in the delivery line 11 in the direction of the second switching position 24b and urged by a spring and by the pressure present in a load pressure-indicating line 25 in the direction of the first switching position 24a.

The control valve devices 13, 15, 17, 18 are used, upon an actuation of the corresponding consumers, to indicate the load pressure of the driven consumer to an associated load pressure-indicating branch line 25a, 25b, 25c, 25d, the highest load pressure being led to the load pressure-indicating line 25 by means of a selecting device formed by shuttle valves 26a, 26b, 26c.

In the load pressure-indicating line 25 there is furthermore arranged a selecting valve 27, which is designed as a shuttle valve, and serves for selecting the highest load pressure of the steering device 19 or of the driven consumers of the working hydraulics 6. A first inlet of the selecting valve 27 is, in this case, connected to that section 25e of the load pressure-indicating line which conveys the highest load pressure of the consumers of the working hydraulics 6. A second inlet of the selecting valve 27 is connected to a load pressure-indicating line 25f of the steering device 19. To the outlet of the selecting valve 27 is connected that section of the load pressure-indicating line 25 which is led to the demand flow-regulating valve 24.

The load pressure-indicating line 25e is furthermore assigned a maximum pressure-safeguarding device 45, which is designed, for example, as a pressure-limiting valve.

According to the invention (as can be seen from FIG. 1 viewed together with FIG. 2), a pressure valve 9, which is designed as an electrically actuable, proportionally adjustable pressure valve, is arranged in the delivery line 11 downstream of the priority valve 20 for the steering device 19 and upstream of the connections of the control valve devices 13, 15, 17, 18 to the delivery line 11. In the non-driven state, the pressure valve 9 is urged towards a minimum setting pressure and can be urged by means of an electrical actuating device 28 designed as a proportional magnet in the direction of an increased setting pressure.

Figure 2:
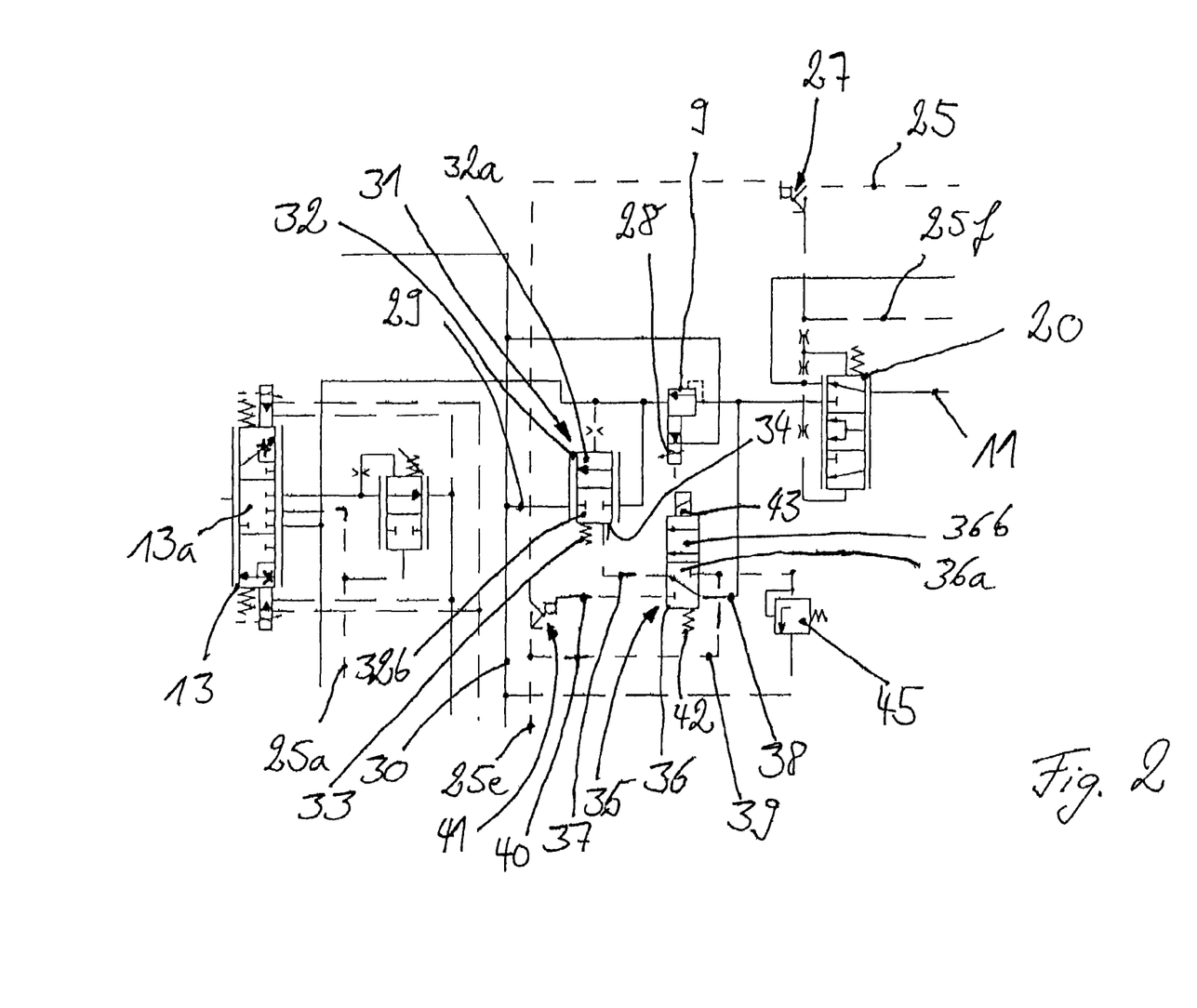
FIG. 2 shows the connection diagram of FIG. 1 in an enlarged illustration.

Downstream of the pressure valve 9, a branch line 29 branches off the delivery line 11 leading to the control valve devices 13, 15, 17, 18 and is connected to a container line 30 led to the container 10. Arranged in the branch line 29 is a circulating device 31, which is designed as a pressure balance 32 with a throughflow position 32a and a blocking position 32b. The circulating device 31 is urged, by the pressure present in the delivery line 11 downstream of the pressure valve 9, in the direction of the throughflow position 32a. The circulating device 31 is urged in the direction of the blocking position 32b by a spring 33. The urging of a control surface 34, likewise acting in the direction of the blocking position 32b, of the circulating device 31 is controllable by means of a switching valve device 35.

The switching valve device 35 is designed as a switch-over valve 36, which in a first switching position 36a connects a branch line 37, led to the control surface 34 of the circulating device 31, to a delivery branch line 38 which is connected to the delivery line 11 upstream of the pressure valve 9. In a second switching position 36b of the switch-over valve 36, the branch line 37 is connected to a load pressure-indicating branch line 39, which is connected to the load pressure-indicating line 25e, in which the highest load pressure of the driven consumers of the working hydraulics 6 is conveyed. In the second switching position 36b, furthermore, the delivery branch line 38 is connected to a branch line 40. The branch line 40 is connected to one inlet of a selecting device 41, designed as a shuttle valve, to the further inlet of which the load pressure-indicating line 25e is connected. On the outlet side, the selecting device 41 is connected to an inlet of the selecting valve 27.

The switch-over valve 36 is urged by means of a spring 42 into the first switching position 36a and can be urged by means of an electrical actuating device 43 designed as a switching magnet into the second switching position 36b.

In the non-driven state, the pressure valve 9 is situated for a minimum setting pressure. The switch-over valve 36 is situated in the first switching position 36a, as a result of which the circulating device 31 is urged by the spring 33 into the blocking position 32b.

If the working hydraulics 6 are not driven and the steering device 19 is not driven, the pump 5 is situated in a neutral position, in which a delivery pressure corresponding to the preload of the spring of the demand flow-regulating valve 24 is accumulated in the delivery line 11. If the steering device 19 is driven and/or the working hydraulics 6 are driven by actuating one or more control valves 13, 15, 17, 18 when the working vehicle is stationary or in the drive phase of the travel drive 4, the highest load pressure of the driven consumers is led via the shuttle valves 26a, 26b, 26c and also the selecting device 41 and the selecting valve 27 to the demand flow-regulating valve 24. As a result of which, the demand flow-regulating valve 24 is urged in the direction of the switching position 24a. The pump 5 thus swings in the direction of maximum delivery in order to deliver the delivery flow demanded by the consumers. The circulating device 31 is, in this case, urged by the switch-over valve 36, situated in the first switching position 36a, into the blocking position 32b.

If, in a braking or overrun condition of the travel drive 4, the rotational speed of the driving engine 1 exceeds a predetermined rotational speed limit value, the pressure valve 9 is set to an increased biasing pressure by means of the actuating device 28 in accordance with the change in rotational speed of the driving engine 1 in order to achieve an additional braking action. As a result of which, the braking power can be adapted to the operating state of the driving engine. Simultaneously, the switch-over valve 36 is urged into the second switching position 36b by means of the actuating device 43. The delivery pressure in the delivery branch line 38 is thus present, via the branch line 40, the selecting device 41, and the selecting valve 27, in the load pressure-indicating line 25, and, thus, at the spring side of the demand flow-regulating valve 24 and urges the demand flow-regulating valve 24 in the direction of the switching position 24a. As a result of which, the pump 5 swings into the position for maximum delivery. In the second switching position 36b of the switch-over valve 36, furthermore, the branch line 37 led to the control surface 34 of the circulating device 31 is connected to the branch line 39 which is connected to the load pressure-indicating line 25e of the working hydraulics 6. As a result of which, the circulating device 31 is urged from the blocking position 32b into the throughflow position 32a, in which the circulating device 31 has the function of a pressure balance 32.

The delivery flow delivered by the pump 5 can thus, in a braking or overrun condition, where an additional braking action is achieved by means of the pressure valve 9, flow off to the container 10 via the circulating device 31 having the function of an inlet pressure balance after flowing through the pressure valve 9. If, in a braking or overrun condition of the travel drive 4, when the pressure valve 9 is driven, a consumer of the working hydraulics 6 is driven, the corresponding highest load pressure of the driven consumers of the working hydraulics, which is conveyed in the load pressure-indicating line 25e, urges the pressure balance 32 in the direction of the blocking position 32b via the switch-over valve 36 urged into the second switching position 36b. As a result of which, a normal operation of the consumers of the working hydraulics 6 is ensured in braking or overrun conditions and with an additional braking action through the pressure valve 9. The pressure medium delivered in excess by the pump 5 and exceeding the demand of the driven consumers of the working hydraulics 6 can, in this case, flow off to the container 10 via the pressure balance 32.

Figure 3:
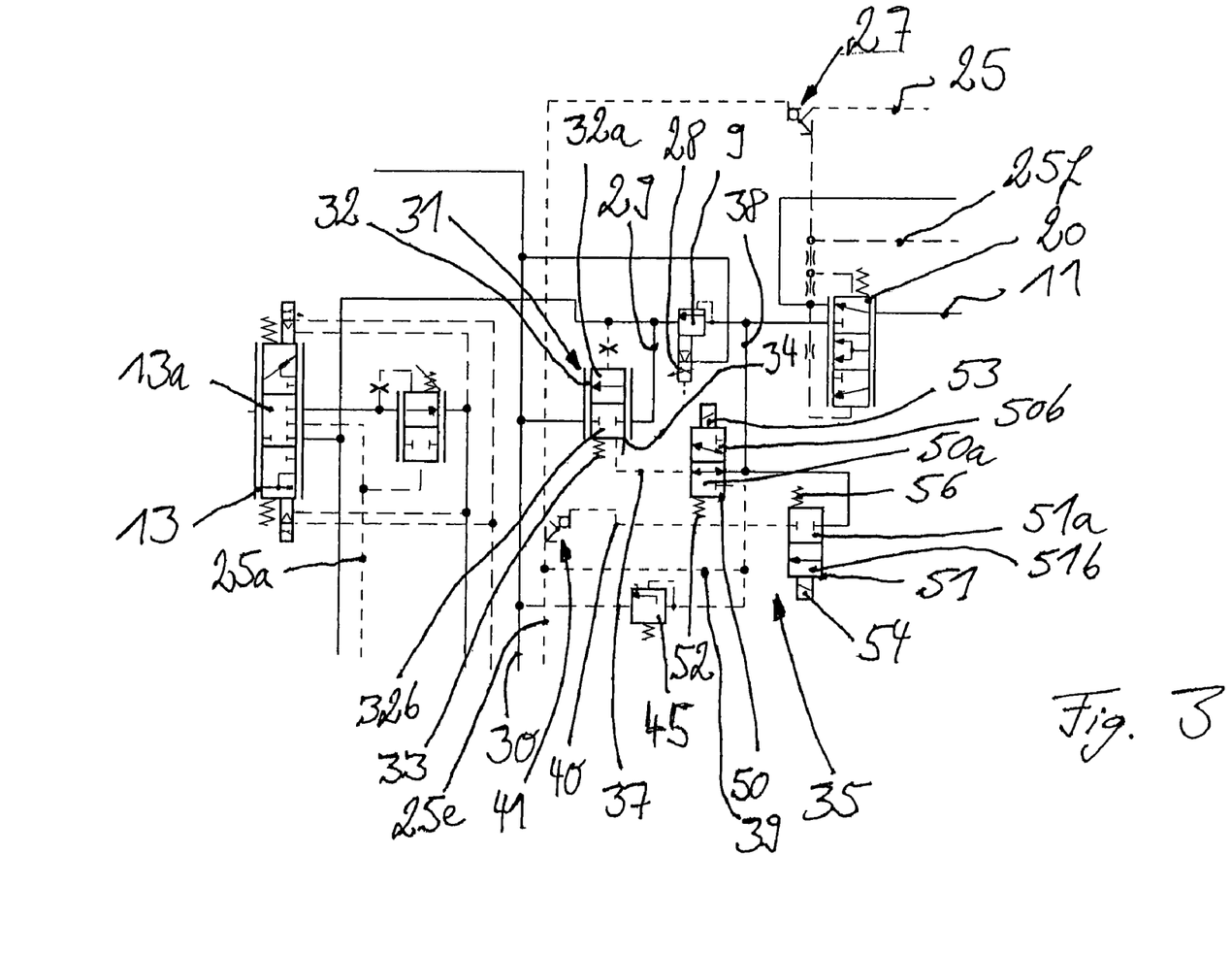
FIG. 3 shows the connection diagram of a second embodiment of a drive system according to the invention.

In the embodiment of the invention illustrated in FIG. 3, the switching valve device 35 is formed by a first switching valve 50 and a second switching valve 51. In a first switching position 50a, the first valve 50 connects the branch line 37, led to the control surface 34 of the circulating device 31, to the delivery branch line 38. In a second switching position 50b, the branch line 37 is connected via the load pressure-indicating branch line 39 to the load pressure-indicating line 25e of the working hydraulics 6. The first valve 50 is urged in the direction of the first switching position 50a by a spring 52 and can be switched over into the second switching position 50b by an electrical actuating device 53 designed as a switching magnet. The second switching valve 51 blocks the connection of the delivery branch line 38 to the branch line 40 in a first switching position 51a and frees the connection of the delivery branch line 38 to the branch line 40 in the second switching position 51b. The second valve 51 is urged in the direction of the first switching position 51a by a spring 56 and can be switched over into the second switching position 51b by an electrical actuating device 54 designed as a switching magnet.

Through the second valve 51, the swinging of the pump 5 into the position for maximum delivery in a braking or overrun condition can be controlled independently of the switching-over, controlled by the first valve 50, of the circulating device 31 from the blocking position 32b into the throughflow position 32a and, thus, to the function of the pressure balance 32. As a result, it is possible to use a pump 5 to supply the working hydraulics 6, which in the neutral position, when the consumers are not driven, delivers a constant minimum delivery flow for supplying the working hydraulics 6 and the steering device 19.

In order to lead the minimum delivery flow, delivered by the pump 5 when the consumers are not driven, to the container 10, the first switching valve 50 is urged, by driving the actuating device 53, into the second switching position 50b. As a result of which, the circulating device 31 is urged from the blocking position 32b in the direction of the throughflow position 32a and the minimum delivery flow delivered by the pump 5 can flow off to the container 10 via the circulating device 31 operating as a pressure balance 32.

If, in a braking or overrun condition, the rotational speed of the driving engine 1 exceeds a predetermined rotational speed limit value, in addition to urging the first valve 50 into the second switching position 50b by driving the actuating device 53, simultaneously the pressure valve 9 is adjusted to an increased setting pressure and the second valve 51 is urged by means of the actuating device 54 into the second switching position 51b. As a result of which, the pump 5 swings into the position for the maximum delivery flow. The delivery flow delivered by the pump 5 in a braking or overrun condition can, in this case, flow off to the container 10 via the circulating device 31 operating as a pressure balance 32 after flowing through the pressure valve 9.

If, in a braking or overrun condition and with driving of the pressure valve 9 to generate an additional braking action, a consumer of the working hydraulics 6 is driven, the corresponding highest load pressure of the driven consumers which is conveyed in the load pressure-indicating line 25e urges the pressure balance 32, via the first switching valve 50 situated in the second switching position 50b, in the direction of the blocking position 32b. As a result of which, a normal operation of the consumers of the working hydraulics 6 is ensured in a braking or overrun condition and with an additional braking action through the pressure valve 9. The pressure medium delivered by the pump 5 and exceeding the demand of the driven consumers of the working hydraulics 6 can, in this case, flow off to the container 10 via the pressure balance 32.

Through the arrangement, according to the invention, of the pressure valve 9 and the circulating device 31, which can be switched over by means of the switching valve device 35 from the blocking position 32*b* into the throughflow position 32*a*, in which the circulating device 31 has the function of a pressure balance 32, the function of a pressure balance 32 is achievable in a simple manner on the circulating device 31 which is normally urged into the blocking position 32*b*, in a drive system with a demand flow-regulated pump 5 for supplying the consumers of the working hydraulics 6 which are controlled by means of control valve devices 13, 15, 17, 18 with a closed neutral position 13*a*, 15*a*, 17*a*, 18*a*, in order to achieve an additional braking action in braking or overrun conditions by driving the pressure valve 9 and at the same time ensure an actuation of the consumers of the working hydraulics 6 and, thus, of the functions of the working hydraulics 6.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A hydrostatic drive system for a mobile machine, comprising:
   a travel drive; and
   working hydraulics, the working hydraulics including a variable delivery pump operatively connected to a driving engine, wherein the delivery pump is connected to a container on an inlet side and delivers to a delivery line, to which at least one consumer of the working hydraulics is connected, wherein the consumer is controllable by a control valve device having a closed neutral position, wherein the pump is adjustable in a direction of a higher delivery to generate a braking action in a braking or overrun condition of the travel drive and wherein pressure medium delivered by the pump is feedable to a pressure valve,
   wherein the pressure valve is arranged in the delivery line led from the delivery pump to the control valve device, and
   wherein a container branch line, which is connected to a container and in which a circulating device is arranged, is connected to the delivery line downstream of the pressure valve.

2. The hydrostatic drive system according to claim 1, wherein the pressure valve is a proportionally adjustable pressure valve proportionally adjustable by an electrical actuating device.

3. The hydrostatic drive system according to claim 2, wherein the actuating device of the pressure valve is a proportional magnet.

4. The hydrostatic drive system according to claim 2, wherein the pressure valve can be urged in a direction of an increase of a setting pressure by means of the actuating device.

5. The hydrostatic drive system according to claim 1, wherein the pressure valve is controllable in dependence on a rotational speed of the driving engine in a braking or overrun condition.

6. The hydrostatic drive system according to claim 1, wherein the circulating device has a blocking position and a throughflow position, the circulating device being able to be urged from the blocking position in the direction of the throughflow position to discharge the pressure medium delivered in excess by the pump.

7. The hydrostatic drive system according to claim 6, wherein the circulating device is a pressure balance which can be urged by a delivery pressure present in the delivery line downstream of the pressure valve in the direction of the throughflow position and can be urged by a spring and by the delivery pressure present in the delivery line in the direction of the blocking position, the urging of the pressure balance in the direction of the blocking position being able to be switched over from the delivery pressure to the load pressure, present in a load pressure-indicating line of the working hydraulics, of the consumer of the working hydraulics in order to discharge the pressure medium delivered in excess by the pump.

8. The hydrostatic drive system according to claim 7, wherein the circulating device is controllable by a switching valve device.

9. The hydrostatic drive system according to claim 8, wherein the switching valve device has a first switching position in which a control surface, acting in the direction of the blocking position, of the circulating device is connected to the delivery line of the pump upstream of the pressure valve, and a second switching position in which the control surface, acting in the direction of the blocking position, of the circulating device is connected to the load pressure-indicating line of the working hydraulics.

10. The hydrostatic drive system according to claim 9, wherein the switching valve device can be urged into the second switching position in order to generate a braking action in a braking or overrun condition or discharge the pressure medium delivered in excess by the pump.

11. The hydrostatic drive system according to claim 8, including an adjusting apparatus which controls the delivery of the pump and can be urged in the direction of an increase of the delivery by means of the switching valve device in order to generate the braking action.

12. The hydrostatic drive system according to claim 11, wherein the adjusting apparatus of the pump includes an adjusting cylinder device with a spring acting in a direction of maximum delivery and a control pressure space acting in a direction of minimum delivery, the loading of which space is controllable by a demand flow-regulating valve having a first switching position which acts in the direction of an increase of the delivery of the pump and in which the control pressure space is connected to the container, and a second switching position which acts in the direction of a reduction of the delivery of the pump and in which the control pressure space is connected to the delivery line of the pump, the demand flow-regulating valve being able to be urged in the direction of the first switching position by a spring and the pressure present in a load pressure-indicating line and in the direction of the second switching position by the delivery pressure present in the delivery line of the pump, the load pressure-indicating line led to the demand flow-regulating valve being connectable to the delivery line of the pump by means of the switching valve device in order to increase the delivery of the pump.

13. The hydrostatic drive system according to claim 12, including a selecting device configured as a shuffle valve device and arranged in the load pressure-indicating line, which selecting device is connected on an outlet side to that section of the load pressure-indicating line which is led to the demand flow-regulating valve, and of which a first inlet is connected to that section of the load pressure-indicating line which is connected to the consumers of the working hydraulics and a second inlet is connected to the outlet of the switching valve device.

14. The hydrostatic drive system according to claim 8, wherein the switching valve device is a switch-over valve which in a first switching position connects a control surface, acting in the direction of the blocking position, of the circulating device to the delivery line of the pump, and in a second switching position connects the control surface, acting in the direction of the blocking position, of the circulating device to the load pressure-indicating line of the working hydraulics, and also connects the delivery line to that section of the load pressure-indicating line which is led to the pump.

15. The hydrostatic drive system according to claim 14, wherein the switch-over valve is controllable by means of an electrical actuating device including a switching magnet.

16. The hydrostatic drive system according to claim 15, wherein the switch-over valve can be urged by means of a spring in the direction of a first switching position and by means of the actuating device in the direction of the second switching position.

17. The hydrostatic drive system according to claim 8, wherein the switching valve device has a first switching valve which in a first switching position connects a control surface, acting in the direction of the blocking position, of the circulating device to the delivery line of the pump, and in a second switching position connects the control surface, acting in the direction of the blocking position, of the circulating device to the load pressure-indicating line of the working hydraulics, and has a second switching valve which in a first switching position closes off the connection of the delivery line to that section of the load pressure-indicating line which is led to the pump, and in a second switching position connects the delivery line to that section of the load pressure-indicating line which is led to the pump.

18. The hydrostatic drive system according to claim 17, wherein the first valve can be urged into the second switching position in order to discharge the pressure medium delivered in excess by the pump.

19. The hydrostatic drive system according to claim 17, wherein at least one of the first switching valve and the second switching valve is controllable by means of an electrical actuating device including a switching magnet.

20. The hydrostatic drive system according to claim 19, wherein at least one of the first switching valve and the second switching valve can be urged by means of a spring in the direction of the first switching position and by means of the actuating device in the direction of the second switching position.

21. The hydrostatic drive system according to claim 12, wherein the pump is provided for controlling a hydraulic steering device, a priority valve being arranged in the delivery line upstream of the pressure valve in order to supply the steering device.

22. The hydrostatic drive system according to claim 21, including a selecting valve configured as a shuffle valve and arranged in a load pressure-indicating line downstream of a selecting device, of which valve the outlet is connected to that section of the load pressure-indicating line which is led to the demand flow-regulating valve, the first inlet is connected to that section of the load pressure-indicating line which is connected to the outlet of the selecting device and the second inlet is connected to a load pressure-indicating line of the steering device.

23. The hydrostatic drive system according to claim 8, wherein at least one of the circulating device, the pressure valve, and the switching valve device are arranged in a control valve block of the working hydraulics.

\* \* \* \* \*

UNITED STATES PATENT AND TRADEMARK OFFICE
CERTIFICATE OF CORRECTION

PATENT NO.        : 7,559,401 B2                                          Page 1 of 1
APPLICATION NO. : 11/234071
DATED             : July 14, 2009
INVENTOR(S)       : Binev

It is certified that error appears in the above-identified patent and that said Letters Patent is hereby corrected as shown below:

Column 12, Line 62, Claim 13, "shuffle valve" should read -- shuttle valve --

Column 14, Line 21, Claim 22, "shuffle valve" should read -- shuttle valve --

Signed and Sealed this

Seventeenth Day of November, 2009

David J. Kappos
*Director of the United States Patent and Trademark Office*